A. G. KRAMER.
DIVIDERS.
APPLICATION FILED FEB. 20, 1919.
1,317,879.
Patented Oct. 7, 1919.
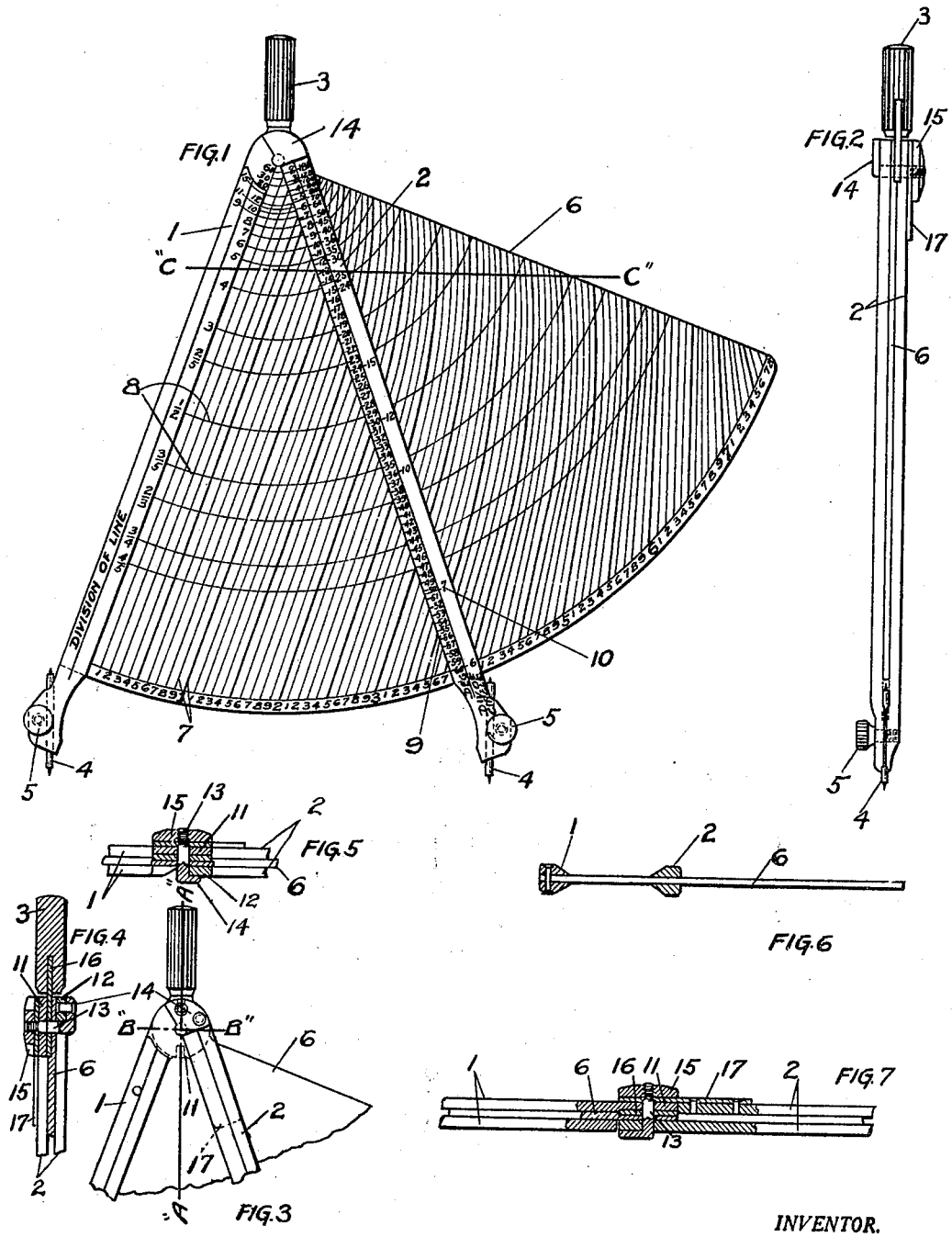
INVENTOR.
ARTHUR G. KRAMER
BY
ATTORNEY

UNITED STATES PATENT OFFICE.

ARTHUR G. KRAMER, OF DAYTON, OHIO.

DIVIDERS.

1,317,879.  Specification of Letters Patent.  Patented Oct. 7, 1919.

Application filed February 20, 1919. Serial No. 278,213.

*To all whom it may concern:*

Be it known that I, ARTHUR G. KRAMER, a citizen of the United States, residing at Dayton, in the county of Montgomery and State of Ohio, have invented certain new and useful Improvements in Dividers, of which the following is a specification, reference being had therein to the accompanying drawing.

This invention relates to dividers and similar instruments and the object of the invention is to provide such an instrument with means whereby divisions of lines and measurements of divisions of lines, either straight or curved, may be quickly and accurately determined; and which may be used to make calculations or as a protractor.

In the accompanying drawings Figure 1 is a front elevation of an instrument embodying my invention; Fig. 2 is an edge view of the same; Fig. 3 is a detail view of the hinged connection between the two arms of the instrument; Fig. 4 is a sectional view taken on the line A—A of Fig. 3; Fig. 5 is a sectional view taken on the line B—B of Fig. 3; Fig. 6 is a section taken on the line $c$—$c$ of Fig. 1; and Fig. 7 is a plan view of the dividers, partly in section, with the arms fully extended.

In these drawings I have illustrated one embodiment of my invention and have shown the same as applied to a pair of dividers comprising two arms, 1 and 2, which are pivotally connected one to the other at their upper ends and are provided with a finger piece 3. The adjacent edges of the arms 1 and 2 extend radially from the axis of the hinged connection and will lie parallel one with the other when the arms are moved into proximity one with the other. The free ends of these arms are provided with points which are preferably adjustable and are here shown as pins 4 mounted in the ends of the arms and clamped in position by means of set screws 5, the pins being so arranged that when properly adjusted the points thereof will lie in radial alinement with the inner edges of the respective arms.

Rigidly secured to the arm 1, which may be referred to as a fixed arm, is a sector shaped plate 6 which intersects the second or movable arm 2 so that the latter will move over the surface thereof when it is adjusted relatively to the fixed arm. This sector shaped plate 6 is of a radial length slightly less than the length of the arms 1 and 2, and its curved base is so arranged that it will occupy the same position with relation to the point 4 of the movable arm 2 in whatever position that arm may be placed. This base is graduated to indicate the distance between the points of two arms. In the present instance this graduation is in inches and tenths thereof, but, obviously, any desired unit of measurement may be used. Because of the fact that the base line of the plate is spaced radially from the point of the arms, it will be apparent that the numerals on the base line do not represent the actual length of the base line, but represent the distance between the point of the fixed arm 1 and the points of the movable arm 2, this distance being represented by the reading on the base line at the point where the movable arm intersects the same. As shown in Fig. 1, the distance between the points of the two arms is slightly less than $3\frac{8}{10}$ inches. Lines 7 extend from the graduations on the base line across the surface of the plate 6 and intersect the movable arm 2 at different points in its length, the point of intersection, of course, changing as the arm is moved about its axis. These lines extend lengthwise of the fixed arm and serve to extend the graduations across the face of the plate to connect the same with the movable arm 2. The lines 7 are intersected at intervals by other lines 8 which extend from the inner edge of the fixed arm 1 and comprise arcs of circles described about the axis of the movable arm and each having a different radius. These lines 8 are spaced apart different distances and represent different fractions of a unit of measurement, these fractions being indicated on the face of the fixed arm, in the form of graduations, and are here shown as including various fractional parts of a unit, from one-sixtieth thereof to four-fifths thereof, but, obviously, the positions of the lines are arbitrary and may be changed, or additions may be made thereto. The several lines 7 are each spaced from the inner edge of the fixed arm 1 such a distance that the chords of the several arcs 8 which extend between a given line 7 and the edge of the fixed arm will be of equal length. Consequently, the lines gradually curve toward the upper end of the fixed arm. The graduations or fractional indications on the fixed arm 1 represent divisions of straight lines and to determine the length of a given portion, say three-fourths, of a line, the ends of which are coincident with the points of the two arms of the instrument, it is only necessary to follow the curved transverse line extending from the graduation "3/4" to its point of intersection with the edge of the movable arm 2 and then trace the longitudinal line 7 from the point of intersection to the graduation upon the base line, and the reading on the base line will be the measurement desired. Likewise, if it is desired to divide a straight line into a given number of parts, say 5, the points of the arms are placed at the ends of the line, or are spaced apart a given distance, and the curved line 8 extending from the graduation "1/5" is traced to its point of intersection with the edge of the movable arm 2, and the longitudinal line 7 nearest said point of intersection is then traced to its point of intersection with the base line. The reading will give the length of a one-fifth part of the line and, by setting the movable arm at this point on the base line, the line can be readily divided into the required number of parts.

To enable a circle to be divided either into degrees or into arbitrary parts of a circle, the movable arm is provided with a double graduation. Along the inner edge of the arm is a series of graduations, 9, corresponding to the degrees of a circle. Along this same edge of the arm is a second series of graduations 10 which, in some instances, coincide with the graduations 9 and the readings for which are arranged between the readings for the graduations 9 and the opposite edge of the arm, so that the two are easily distinguishable. The operation in this case is similar to that followed in securing the division of a line, and the reading is found by setting the points of the arms at the ends of the radius of the circle and then tracing the longitudinal line 7 which intersects the movable arm 10 at the desired point to the base line, where the reading will be found. For example, if it is desired to lay off an arc of a given number of degrees on a circle having a given radius, the points of the dividers are set at the ends of the radius, and the line 7 which intersects the graduation on the arm 2, corresponding to the number of degrees desired, is traced to the base line and the reading on the base line will be the length of the chord of such arc. If it is desired to divide a circle into a given number of parts, say 10, the points of the dividers are set at the ends of the radius and the line 7 which intersects the graduation on the arm 2 corresponding to the number of parts into which the circle is to be divided is traced to the base line, and the reading on the base line will represent the length of a straight line joining adjacent points of division in such circle. It will be obvious that the device can be used not only as a drafting instrument for determining divisions of lines and circles and measurements thereof, but it can be used as a scale or a protractor, or for making calculations, such for example as determining the exact length of a given portion of a line of given length. Various uses will suggest themselves in the use of the instrument. It will also be obvious that both sides of the plate and the arms may be graduated, either with the same or different kinds of calibrations.

The arms 1 and 2 are preferably arranged in a common plane and each arm comprises two parts rigidly secured one to the other but spaced apart to receive the plate 6 between them. Two parts of the arm 1 are rigidly secured to the plate, as by means of rivets, and serve to clamp the same rigidly in position between the same. The two parts of the arm 2 are spaced apart between their ends to form a slot through which the plate extends and which permits the arm to move freely relatively to the plate. In order that the scale on the plate 6 may be carried to the apex of that plate, which is coincident with the axis of the two arms, it has been necessary to provide a special hinged connection between the two arms, which would permit one of the arms or its bearing plate to be cut away below the axis. As here shown, the arm 1 has one of its parts cut away at the upper end and has its other part in the form of a head 11 which is substantially circular in shape, and the arm 2 also has one part cut away and its other part provided with a head 12, the two heads being on the opposite parts of the respective arms and overlapping to permit them to be pivoted one to the other, as by means of a pivot pin 13. The head of the arm 12 is partly cut away, along its lower side, to enable the scale or graduations of the plate and arm to be read clear up to the pivot pin. The pivot pin is provided with a sector like flange or head 14 which is riveted, or otherwise rigidly secured, to the head 12 to form a rigid connection between the arm and the pivot pin. The pivot pin extends through the heads of the two arms, and is held in position by a nut 15 on that end thereof adjacent to the arm 1. The finger piece 3 is secured in place by means of a plate or flat extension 16, which is arranged between the heads of the two arms and through which the pivot pin 13 extends. The upper end of the plate 6 also extends up between the heads of the arms so that the pivot pin will pass through it. I also prefer to provide a washer or brace plate 17 which is interposed between the nut 15 and the head 11 of the arm, and has its lower end secured to the arm 2, so as to bridge the cut away portion of the arm 2, and which serves both to prevent the nut from working loose on the pivot pin, and as a brace to resist the tendency of the arms to spring out of alinement.

While I have shown and described one embodiment of my invention I wish it to be understood that this has been chosen for the purpose of illustration only, and I do not desire to be limited to the details thereof, as obvious modifications will occur to a person skilled in the art.

Having thus fully described my invention, what I claim as new and desire to secure by Letters Patent is:

1. An instrument of the character described comprising a pair of arms hinged one to the other at one end thereof and having points at their free ends, a plate connected with one of said arms and intersecting the other of said arms, said plate having a graduated base line, and having lines forming extensions of the graduations thereof, extending lengthwise of the first mentioned arm and intersecting the last mentioned arm.

2. An instrument of the character described comprising a pair of arms hinged one to the other at one end thereof and having points at their free ends, a plate connected with one of said arms and intersecting the other of said arms, said plate having a graduated base line, and having lines forming extensions of the graduations thereof, extending lengthwise of the first mentioned arm and intersecting the last mentioned arm, said last mentioned arm having graduations to coöperate with the first mentioned graduations.

3. An instrument of the character described comprising a pair of arms hinged one to the other at one end thereof and having points at their free ends, a plate connected with one of said arms and intersecting the other of said arms, said plate having a graduated base line, and having lines forming extensions of the graduations thereof, extending lengthwise of the first mentioned arm and intersecting the last mentioned arm, said last mentioned arm being graduated to represent parts of a circle and said graduations coöperating with the graduations on said plate to indicate the measurements of the respective parts of said circle.

4. An instrument of the character described comprising a pair of arms hinged one to the other at one end thereof and having points at their free ends, a plate connected with one of said arms and intersecting the other of said arms, said plate having a graduated base line, and having lines forming extensions of the graduations thereof, extending lengthwise of the first mentioned arm and intersecting the last mentioned arm, the first mentioned arm being graduated and said plate having lines extending from the respective graduations and intersecting the first mentioned lines.

5. An instrument of the character described comprising a pair of arms hinged one to the other at one end thereof and having points at their free ends, a plate connected with one of said arms and intersecting the other of said arms, said plate having a graduated base line, and having lines forming extensions of the graduations thereof, extending lengthwise of the first mentioned arm and intersecting the last mentioned arm, said plate also having lines extending transversely to said first mentioned arm and intersecting the first mentioned lines, said transverse lines being relatively spaced and marked to indicate divisions of a line.

6. An instrument of the character described comprising a pair of arms hinged one to the other at one end thereof and having points at their free ends, a plate connected with one of said arms and intersecting the other of said arms, said plate having a graduated base line, and having lines forming extensions of the graduations thereof, extending lengthwise of the first mentioned arm and intersecting the last mentioned arm, said plate also having a series of curved lines described on different radii about the axis of said arms.

7. In an instrument of the character described, a sector shaped plate having one lateral edge provided with graduations in fractions of a unit and having arcuate lines described about the apex of said plate as a center and leading from said graduations, said plate also having a graduated base line and substantially parallel lines extending from the respective graduations on said base line and intersecting said curved lines, and an arm pivotally mounted at the apex of said plate and intersecting the last mentioned lines.

8. In an instrument of the character described, a sector shaped plate having a series of arcuate lines described on different radii about the apex of said plate as a center, said plate also having its curved edge graduated and having substantially parallel lines extending from the respective graduations and intersecting said curved lines, and an arm pivotally mounted at the apex of said plate and movable over said graduations.

9. In an instrument of the character described, a sector shaped plate having a series of arcuate lines described on different radii about the apex of said plate as a center, said plate also having its curved edge graduated and having lines extending from the respective graduations and intersecting said curved lines, and an arm pivotally mounted at the apex of said plate and movable over said graduations, said arm also being graduated to coöperate with said lines and the first mentioned graduations.

10. In an instrument of the character described, a sector shaped plate, a fixed arm extending along one of the straight edges of said plate, and a movable arm pivoted at the apex of said plate, said plate being graduated along the curved edge thereof and having a series of lines arranged parallel with and spaced different distances from said curved edge of said plate.

11. In an instrument of the character described, a sector shaped plate, a fixed arm extending along one of the straight edges of said plate and a movable arm pivoted at the apex of said plate, said plate being graduated along the curved edge thereof and having lines extending lengthwise of said fixed arm and constituting extensions of said graduations, and also having a series of lines arranged parallel with and spaced different distances from said curved edge of said plate, said lines being marked to represent different fractions of a unit.

12. In an instrument of the character described, a sector shaped plate, a fixed arm extending along one edge of said plate and a movable arm pivoted at the apex of said plate, said plate being graduated along the curved edge thereof and having lines forming extensions of said graduations, said fixed arm being graduated and said plate having lines extending parallel with the curved edge thereof and forming extensions of the graduations on said fixed arm, said movable arm having graduations which may be moved into registration with the different lines on said plates.

13. An instrument of the character described comprising a pair of arms pivoted one to the other at one end of said instrument and each comprising two parts, a plate clamped between the two parts of one of said arms and the two parts of the other arm being spaced apart to form a slot through which said plate extends, said plate and one of said arms having coöperative graduations.

14. An instrument of the character described comprising a pair of arms provided at their upper ends with overlapping heads, a pivot pin extending through said heads and a plate carried by one of said arms and extending to said pivot pin, one of said heads being cut away to expose that portion of said plate adjacent to said pivot pin.

15. An instrument of the character described comprising a pair of arms provided at their upper ends with overlapping heads, a pivot pin extending through said heads and a plate carried by one of said arms and extending to said pivot pin, one of said heads being cut away to expose that portion of said plate adjacent to said pivot pin, said pivot pin having a laterally extending head portion rigidly secured to the head of the last mentioned arm opposite the cut away portion thereof.

16. An instrument of the character described comprising a pair of arms provided at their upper ends with overlapping heads, a pivot pin extending through said head and a plate carried by one of said arms and extending to said pivot pin, one of said heads being cut away to expose that portion of said plate adjacent to said pivot pin, said pivot pin having a laterally extending head portion rigidly secured to the head of the last mentioned arm opposite the cut away portion thereof, a nut mounted on that end of said pivot pin opposite its head, a washer mounted on said pivot pin between the same and that arm to which said plate is secured, and having its end portion secured to the other arm.

In testimony whereof I affix my signature hereto.

ARTHUR G. KRAMER.

Copies of this patent may be obtained for five cents each, by addressing the "Commissioner of Patents, Washington, D. C."